(12) United States Patent
Tanimoto et al.

(10) Patent No.: US 9,160,211 B2
(45) Date of Patent: Oct. 13, 2015

(54) WORK MACHINE AND BRUSHLESS MOTOR

(75) Inventors: Hideyuki Tanimoto, Hitachinaka (JP);
Chikai Yoshimizu, Hitachinaka (JP);
Nobuhiro Takano, Hitachinaka (JP);
Hiromi Ozawa, Hitachinaka (JP);
Kazuhiko Funabashi, Hitachinaka (JP)

(73) Assignee: HITACHI KOKI CO., LTD., Tokyo (JP)

( * ) Notice: Subject to any disclaimer, the term of this patent is extended or adjusted under 35 U.S.C. 154(b) by 0 days.

(21) Appl. No.: 13/382,761

(22) PCT Filed: Sep. 22, 2010

(86) PCT No.: PCT/JP2010/005748
§ 371 (c)(1),
(2), (4) Date: Jan. 6, 2012

(87) PCT Pub. No.: WO2011/039978
PCT Pub. Date: Apr. 7, 2011

(65) Prior Publication Data
US 2012/0104983 A1    May 3, 2012

(30) Foreign Application Priority Data
Sep. 30, 2009    (JP) ................. 2009-229095

(51) Int. Cl.
*H02H 7/09*    (2006.01)
*H02K 7/14*    (2006.01)
(Continued)

(52) U.S. Cl.
CPC ............... *H02K 7/145* (2013.01); *A01D 34/78* (2013.01); *A01D 34/90* (2013.01); *H02K 9/06* (2013.01);
(Continued)

(58) Field of Classification Search
CPC ....... G05B 5/01; G05D 3/122; G05D 3/1427; H02P 7/0044; H02P 6/002; H02P 6/14; H02P 6/16; H02P 29/02; A47L 9/2842; H02H 7/0833
See application file for complete search history.

(56) References Cited

U.S. PATENT DOCUMENTS 3,670,413 A * 6/1972 Weber .............................. 30/276
5,391,952 A    2/1995 Simazu et al.
(Continued)

FOREIGN PATENT DOCUMENTS

CN    201383940 Y    1/2010
DE    203 16 737 U1    12/2003
(Continued)

OTHER PUBLICATIONS

International Search Report and Written Opinion issued in International Patent Application No. PCT/JP2010/005748, dated Mar. 19, 2012.
(Continued)

*Primary Examiner* — Shawki S Ismail
*Assistant Examiner* — Zoheb Imtiaz
(74) *Attorney, Agent, or Firm* — McDermott Will & Emery LLP (57) ABSTRACT

An electric grasscutter includes a motor (50) which drives a rotary blade (42). The motor (50) is a brushless motor accommodated in a motor housing (51) and including a rotor (53) provided integrally with an output shaft (52), and a stator (54) fixed to the motor housing (51). A motor control circuit which drives the motor (50) is accommodated in the motor housing (51). The motor control circuit includes an inverter having FETs (81-86) as switching elements, and a control section to control the FETs (81-86). The FETs (81-86) are fixed in contact with the motor housing (51).

15 Claims, 8 Drawing Sheets

(51) Int. Cl.
  *A01D 34/78* (2006.01)
  *A01D 34/90* (2006.01)
  *H02K 9/06* (2006.01)
  *H02K 11/00* (2006.01)
  *H02K 21/24* (2006.01)
  *H02K 1/27* (2006.01)
  *H02K 5/18* (2006.01)
  *H02K 7/04* (2006.01)

(52) U.S. Cl.
  CPC ............ *H02K 11/0073* (2013.01); *H02K 21/24* (2013.01); *H02K 1/2793* (2013.01); *H02K 5/18* (2013.01); *H02K 7/04* (2013.01)

(56) References Cited

U.S. PATENT DOCUMENTS

| | | | | |
|---|---|---|---|---|
| 5,644,844 | A | * | 7/1997 | Pink ................................ 30/276 |
| 5,662,136 | A | * | 9/1997 | Drzewiecki et al. ............. 137/14 |
| 5,754,025 | A | * | 5/1998 | Nanae et al. .................... 318/747 |
| 7,886,509 | B2 | * | 2/2011 | Itoh et al. .................... 56/10.2 R |
| 8,353,362 | B2 | * | 1/2013 | Liebhard et al. ............... 173/170 |
| 2004/0232873 | A1 | * | 11/2004 | Heizmann et al. ............ 318/653 |
| 2007/0240892 | A1 | * | 10/2007 | Brotto et al. .................. 173/217 |
| 2007/0273221 | A1 | * | 11/2007 | Kinoshita et al. ............... 310/58 |
| 2008/0006015 | A1 | * | 1/2008 | Itoh .................................. 56/255 |
| 2008/0042607 | A1 | * | 2/2008 | Miyazaki et al. .............. 318/504 |
| 2008/0061742 | A1 | * | 3/2008 | Funabashi et al. ............. 320/127 |
| 2008/0106159 | A1 | | 5/2008 | Yoshida et al. |
| 2008/0110148 | A1 | * | 5/2008 | Itoh et al. ........................ 56/10.3 |
| 2008/0150454 | A1 | * | 6/2008 | Ito et al. ............................. 318/8 |
| 2009/0299614 | A1 | * | 12/2009 | Iwata et al. .................... 701/113 |
| 2010/0085005 | A1 | * | 4/2010 | Palmer et al. ................. 318/722 |
| 2010/0129242 | A1 | * | 5/2010 | Yamada et al. ............. 417/423.7 |
| 2012/0104983 | A1 | * | 5/2012 | Tanimoto et al. ........ 318/400.22 |
| 2014/0020919 | A1 | * | 1/2014 | Dvorak et al. .................. 173/75 |

FOREIGN PATENT DOCUMENTS

| | | |
|---|---|---|
| DE | 10 2006 030 780 A1 | 5/2007 |
| EP | 1 869 965 A2 | 12/2007 |
| JP | 04-024411 | 2/1992 |
| JP | 07-36612 | 7/1995 |
| JP | 09-237988 | 9/1997 |
| JP | 2003-101267 A | 4/2003 |
| JP | 2008-272869 A | 11/2008 |
| JP | 2011-045345 A | 3/2011 |
| WO | WO 92/15193 A1 | 9/1992 |
| WO | WO 2007/089936 A2 | 8/2007 |
| WO | WO 2008/017297 A1 | 2/2008 |

OTHER PUBLICATIONS

Japanese Notification of Reasons for Rejection, w/ English translation thereof, issued in Japanese Patent Application No. JP 2009-229095 dated Jul. 30, 2013.

Chinese Office Action issued in Chinese Application No. 201080012785.4 dated Jun. 26, 2014, w/English translation.

* cited by examiner

WORK MACHINE AND BRUSHLESS MOTOR

RELATED APPLICATIONS

This application is the U.S. National Phase under 35 U.S.C. §371 of International Application No. PCT/JP2010/005748, filed on Sep. 22, 2010, which in turn claims the benefit of Japanese Application No. 2009-229095, filed on Sep. 30, 2009, the disclosures of which Applications are incorporated by reference herein.

TECHNICAL FIELD

The present invention relates to a work machine having an electric motor as a drive source and to a brushless motor.

BACKGROUND ART

Patent Literature 1 discloses an electric grasscutter having an electric motor as a drive source. Since electric grasscutters involve a lower running cost as compared with engine-driven grasscutters which use gasoline and the performance of the motors is being improved, electric grasscutters is becoming widespread.

Further, electric grasscutters which use a brushless motor having high efficiency and long life as a drive source in place of a commutator motor, which has been the mainstream, have appeared.

CITATION LIST

Patent Literature

[PTL 1]
Japanese Utility Model Application KOKAI Publication No. H7-036612

SUMMARY OF INVENTION

Technical Problem

A brushless motor is driven by a drive circuit which includes an inverter having FETs as switching elements. Since FETs increase the amount of heat generation as the motor load increases, they become a factor for deficiencies, such as burning of the drive circuit and reduction in the motor power. This often becomes a problem particularly in work machines like an electric grasscutter which are subject to a large variation in motor load.

In view of the problem, it is an object of the present invention to provide a work machine having a brushless motor as a drive source, which prevents burning of the drive circuit and reduction in the motor power both originated from overheating of FETs, and a brushless motor having high efficiency.

Solution to Problem

To achieve the object, a work machine according to the first aspect of the present invention includes:
a housing;
an output shaft rotatably supported at the housing;
a brushless motor accommodated in the housing and including a rotor provided integrally with the output shaft, and a stator fixed to the housing;
a drive circuit accommodated in the housing, including an FET as a switching element and a control section to control the FET, and driving the brushless motor;
a work tool that can be attached to the output shaft;
an operation section disposed apart from the housing; and
a coupling section that couples the housing to the operation section,
wherein the FET is fixed in contact with the housing or a heat sink provided at the housing.

It is desirable that the housing be formed of an aluminum alloy.

It is desirable that the FET be disposed close to that portion of the housing which faces the work tool.

The rotor is desirably provided with a fan.

It is desirable that an exhaust port be formed in the housing, and an inlet port communicating with an interior of the housing be formed, apart from the work tool, in the coupling section.

It is desirable that the rotor include an annular magnet having a plurality of magnetic poles arranged in a circumferential direction and is formed into a disc shape, and the stator face to one main surface of the magnet, include a plurality of coils arranged in the circumferential direction, and be formed into a disc shape.

It is desirable that the rotor further include a magnetic flange fixed to the output shaft and covering the other main surface of the magnet, and the magnet be fixed to the flange.

A blade is desirably formed at the flange in such a way as to protrude from the rotor.

The flange is desirably provided with a balance part for correcting imbalance of the rotor.

It is desirable that a hole or a groove be formed in the flange between an outer periphery of the output shaft and an inner periphery of the magnet for weight reduction.

It is desirable that the work machine further include:
a power supply unit that supplies power to the drive circuit; and
a voltage detecting circuit that detects an output voltage of the power supply unit,
wherein the control section controls the FET based on the output voltage of the power supply unit detected by the voltage detecting circuit in such a way that a voltage applied to the brushless motor becomes a predetermined value.

It is desirable that the work machine further include:
a current detecting circuit that detects a current flowing in the brushless motor,
wherein the control section compares the current flowing in the brushless motor detected by the current detecting circuit with a predetermined reference value to control the FET in such a way as to stop driving the brushless motor, when the current flowing in the brushless motor exceeds the predetermined reference value.

It is desirable that the operation section include a trigger switch, and the control section control the FET in such a way that a voltage applied to the brushless motor becomes a predetermined value corresponding to a trigger amount of the trigger switch.

Furthermore, a brushless motor according to the second aspect of the present invention includes:
a rotor including an annular magnet having a plurality of magnetic poles arranged in a circumferential direction and formed into a disc shape;
a stator facing to one main surface of the magnet, including a plurality of coils arranged in the circumferential direction, and formed into a disc shape; and
a magnetic flange provided at the rotor and covering the other main surface of the magnet,
wherein a blade is formed at the flange in such a way as to protrude from the rotor.

Furthermore, a brushless motor according to the third aspect of the present invention includes:
- a rotor including an annular magnet having a plurality of magnetic poles arranged in a circumferential direction and formed into a disc shape;
- a stator facing to one main surface of the magnet, including a plurality of coils arranged in the circumferential direction, and formed into a disc shape; and
- a magnetic flange provided at the rotor and covering the other main surface of the magnet,
- wherein a flange is provided with a balance part for correcting imbalance of the rotor.

It is desirable that the flange be fixed to an output shaft, and a hole or a groove be formed in the flange between an outer periphery of the output shaft and an inner periphery of the magnet for weight reduction.

Advantageous Effects of Invention

The present invention can provide a work machine which has a brushless motor as a drive source, and prevents burning of the drive circuit and reduction in the motor power both originated from overheating of FETs and provide a brushless motor having high efficiency.

DESCRIPTION OF EMBODIMENTS

An embodiment for carrying out the invention will be described below with reference to the accompanying drawings.

Figure 1:
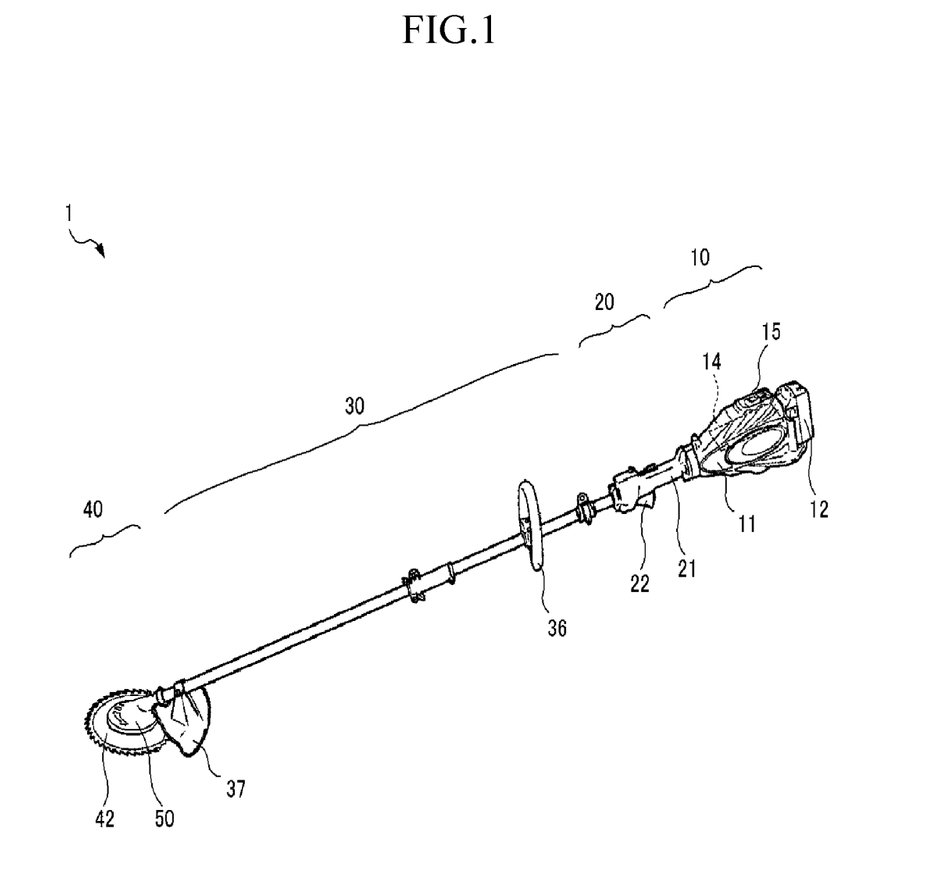
FIG. 1 is a perspective view showing an electric grasscutter according to an embodiment of the present invention.

FIG. 1 is a perspective view showing an electric grasscutter 1 according to an embodiment of the present invention. The electric grasscutter 1 includes a power supply unit 10, an operation section 20, a coupling section 30, and a drive unit 40.

The power supply unit 10 is situated at the rear end of the electric grasscutter 1. The power supply unit 10 includes a power supply housing 11, a battery 12, and a power supply circuit 14.

The power supply housing 11 accommodates the power supply circuit 14. A main switch 15 for setting on or off the main power supply of the power supply circuit 14 is provided on the top surface of the power supply housing 11.

The battery 12 is mounted to an unillustrated battery holder provided at the rear end of the power supply housing 11. The battery 12 supplies power to the power supply circuit 14.

The power supply circuit 14 outputs the output voltage of the battery 12 to a motor 50 to be described later of the drive unit 40.

The operation section 20 is fixed to the front end of the power supply unit 10. The operation section 20 includes a handle 21, and a trigger switch 22.

The handle 21 is fixed to the front end of the power supply housing 11, and fixed to the rear end of the coupling section 30. The trigger switch 22 has functions to drive/stop the motor 50 and adjust the output (the number of rotations) of the motor 50 according to the trigger amount.

The coupling section 30 is a hollow tube formed of an aluminum alloy, fiber reinforced plastics or the like, and couples the handle 21 of the operation section 20 and the motor 50 of the drive unit 40 together. An unillustrated power line extending from the power supply circuit 14 of the power supply unit 10 to the motor 50 of the drive unit 40 is inserted in the coupling section 30. An auxiliary handle 36 is attached to the coupling section 30. Further, a protection cover 37, which covers part of a rotary blade (work tool) 42 of the drive unit 40, is attached to the coupling section 30.

The drive unit 40 is fixed to the front end of the coupling section 30, and is situated at the front end of the electric grasscutter 1. The drive unit 40 includes the motor 50, and the rotary blade 42.

The motor 50 is fixed to the front end of the coupling section 30. The motor 50 will be elaborated below with reference to FIG. 2.

Figure 2:
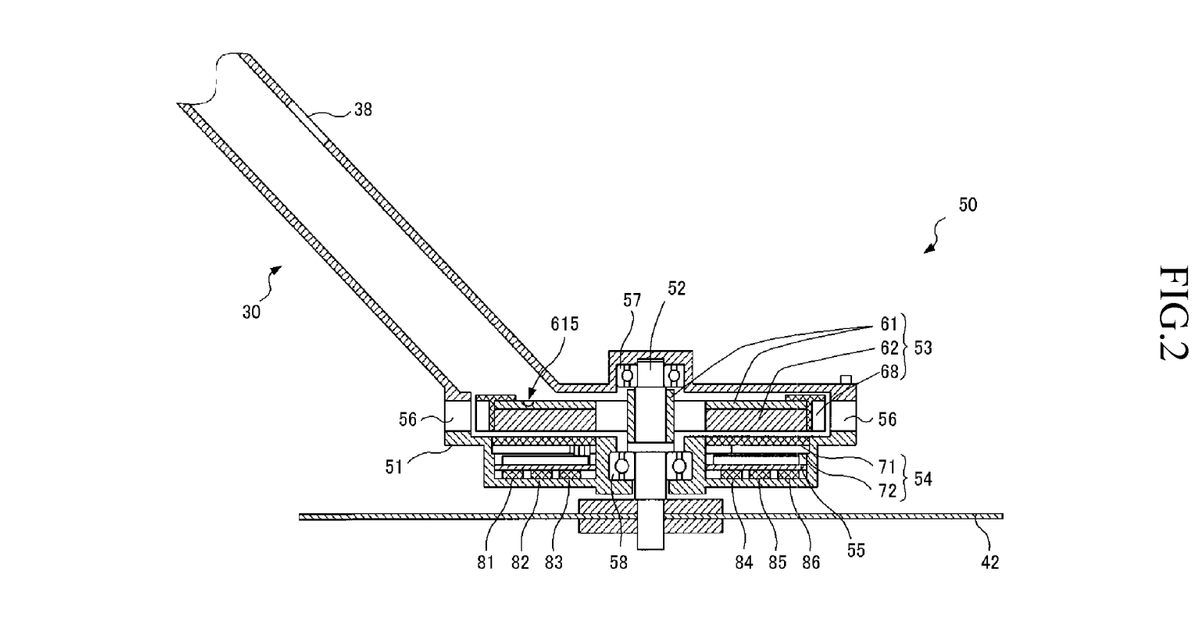
FIG. 2 is a cross-sectional view showing the motor of the electric grasscutter shown in FIG. 1.

The motor 50 is a brushless DC motor which includes a motor housing 51, an output shaft 52, a rotor 53, and a stator 54.

The motor housing 51 is formed of an aluminum alloy, and is fixed to the front end of the coupling section 30. An exhaust port 56 is formed in the motor housing 51. On the other hand, an inlet port 38, which communicates with the interior of the motor housing 51 and the exhaust port 56, is formed in the coupling section 30.

The output shaft 52 is rotatably supported by bearings 57, 58 provided at the motor housing 51. The lower end of the output shaft 52 protrudes from the motor housing 51, and the rotary blade 42 is fixed to the lower end.

Figure 3:
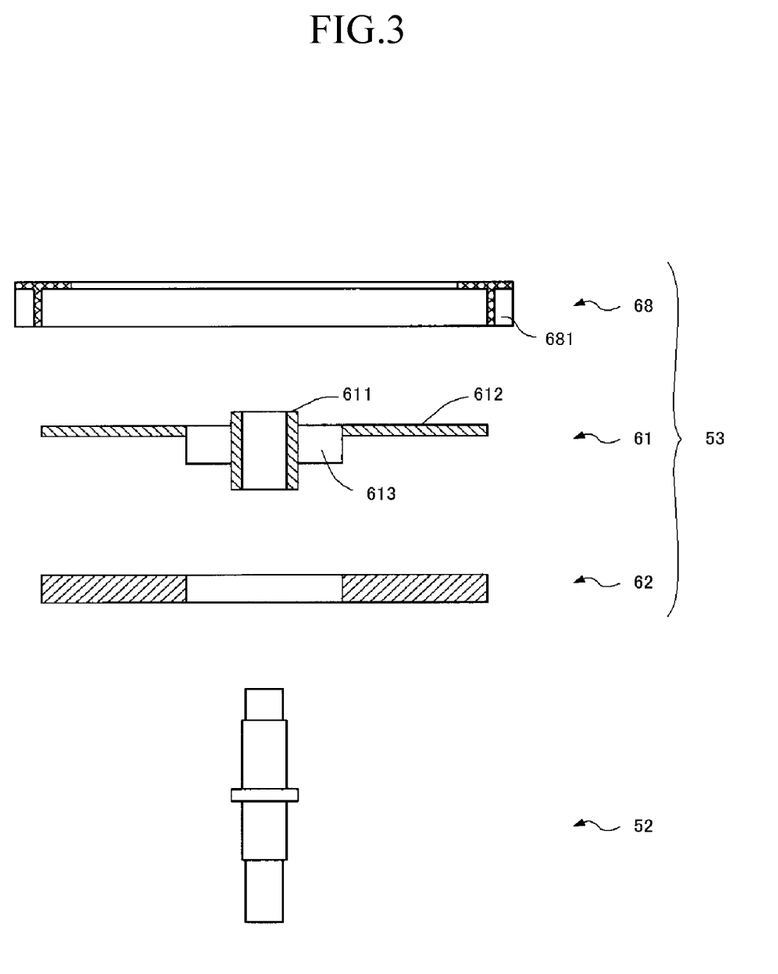
FIG. 3 is an exploded cross-sectional view showing the output shaft and rotor of the motor shown in FIG. 2.

The rotor 53 is accommodated in the motor housing 51, and is provided integrally with the output shaft 52. As shown in FIG. 3, the rotor 53 includes a flange 61, a magnet 62, and a fan 68.

Figure 4:
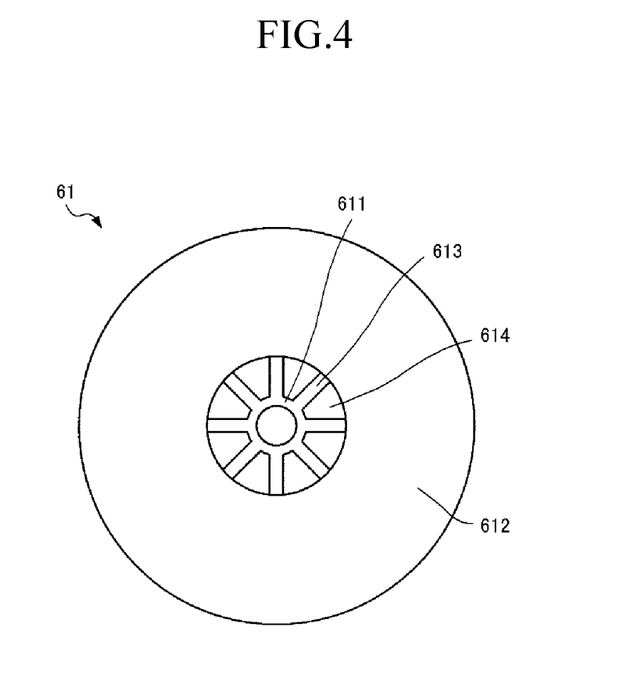
FIG. 4 is a bottom view showing the flange of the rotor shown in FIG. 3.

The flange 61 is formed of a magnetic substance such as iron. The flange 61 includes a circular cylindrical fixing member 611, a plurality of ribs 613 radially extending from the outer peripheral surface of the fixing member 611, and a disc-shaped support member 612 provided at the outer peripheries of the ribs 613. The fixing member 611 is fitted over the output shaft 52 for detent, so that the flange 61 rotates together with the output shaft 52. As shown in FIG. 4, a plurality of holes 614 are formed by and between the ribs 613 for weight reduction. Instead of the holes 614, a groove may be formed in the flange 61 between the outer periphery of the output shaft 52 and the inner periphery of the magnet 62 for weight reduction.

Figure 5:
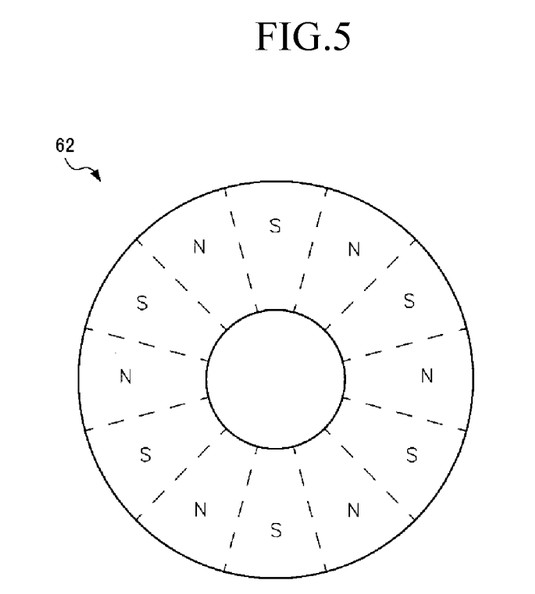
FIG. 5 is a bottom view showing the magnet of the rotor shown in FIG. 3.

As shown in FIG. 3, the magnet 62 is formed in an annular and flat shape, and is securely fixed to the bottom surface of the support member 612 of the flange 61 by an adhesive or the like. As shown in FIG. 5, the magnet 62 has a plurality of magnetic poles (N poles and S poles) arranged in the circumferential direction. Referring to FIGS. 2 and 3, the support member 612 of the flange 61 formed of a magnetic substance forms a magnetic path to concentrate the magnetic flux of the magnet 62 in the up-down direction.

Figure 6:
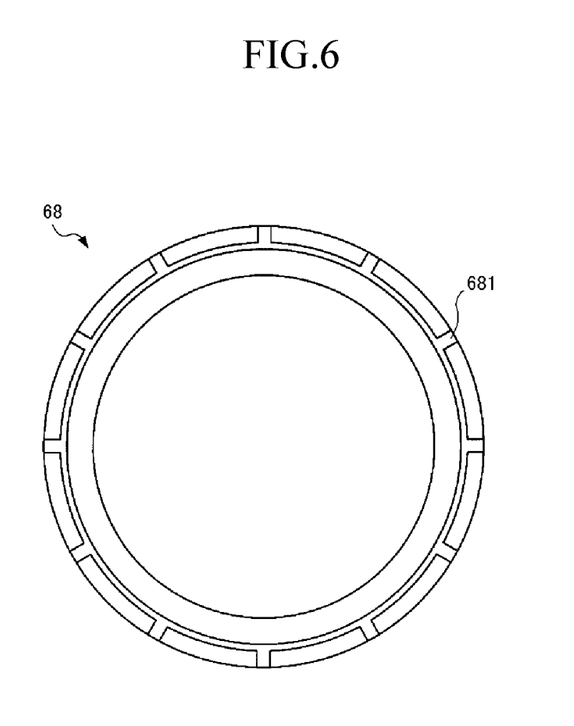
FIG. 6 is a bottom view showing the fan of the rotor shown in FIG. 3.

As shown in FIG. 3, The fan 68 is formed of a synthetic resin in an annular shape, is fitted over the outer peripheral surfaces of the flange 61 and the magnet 62, and is securely fixed to the top surface of the flange 61 by an adhesive or the like. The fan 68 has a plurality of blades 681 formed protruding in the outer diametrical direction. The blades 681 are arranged at substantially equal distances in the circumferential direction as shown in FIG. 6.

As shown in FIG. 2, a hole 615 is formed in the top surface of the support member 612 of the flange 61 to correct imbalance of the rotor 53 (imbalance of the weight to the rotary shaft). That is, the support member 612 constitutes a balance part according to the invention. An unillustrated weight may be provided on the top surface of the support member 612 to correct imbalance of the rotor 53.

Figure 7:
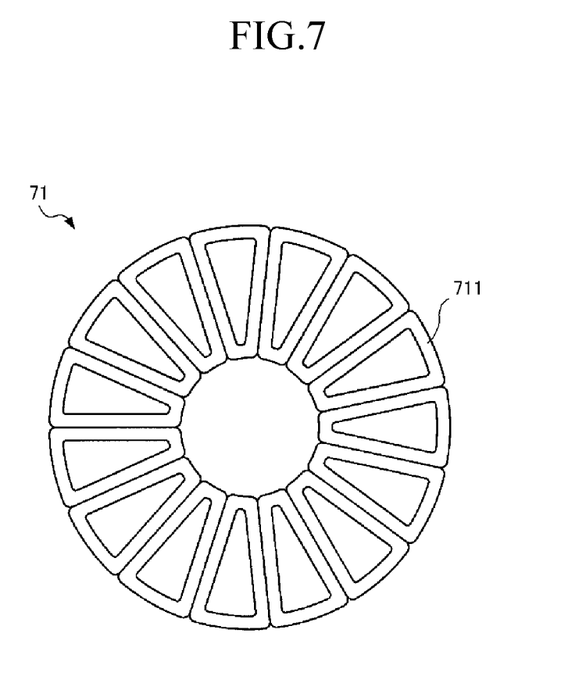
FIG. 7 is a top view showing the stator winding of the motor shown in FIG. 2.

The stator 54 includes a stator winding 71 and a yoke 72. The stator 54 is fixed to the motor housing 51, facing the bottom surface of the magnet 62. As shown in FIG. 7, the stator winding 71 includes a plurality of coils 711 arranged in the circumferential direction, and is formed in an annular and flat shape. Based on a current supplied from a motor drive board 55 to be described later, each coil 711 generates a magnetic field in the up-down direction in FIG. 2. The yoke 72 is formed of a magnetic substance like iron in an annular and flat shape, and is securely fixed to the bottom surface of the stator winding 71. The yoke 72 forms a magnetic path to concentrate the magnetic flux in the up-down direction.

The motor housing 51 accommodates the motor drive board 55 for driving the motor 50. The motor drive board 55 is a printed board on which a motor drive circuit 300 to be described later including FETs 81 to 86 is mounted. The motor drive board 55 is fixed to the motor housing 51, facing the stator 54 and the floor surface of the motor housing 51. The FETs 81 to 86 are switching elements constituting an inverter 301 to be described later, and are fixed in contact with the floor surface of the motor housing 51. That is, the motor housing 51 formed of an aluminum alloy serves as a heat sink for the FETs 81 to 86. The motor drive board 55 is connected to the power supply circuit 14 of the power supply unit 10 via the unillustrated power line inserted in the coupling section 30.

A voltage applied to the motor drive board 55 from the power supply circuit 14 of the power supply unit 10 is sequentially applied to the coils 711 of the stator winding 71 of the stator 54 via the motor drive circuit 300. Due to the force of attraction that is generated between the excited coils 711 and the magnet 62 of the rotor 53, the rotor 53 and the output shaft 52 fixed to the rotor 53 rotate.

The rotary blade 42 is attached to the output shaft 52 of the motor 50. The rotary blade 42 rotates by receiving the power of the motor 50 to cut grasses or the like.

Figure 8:
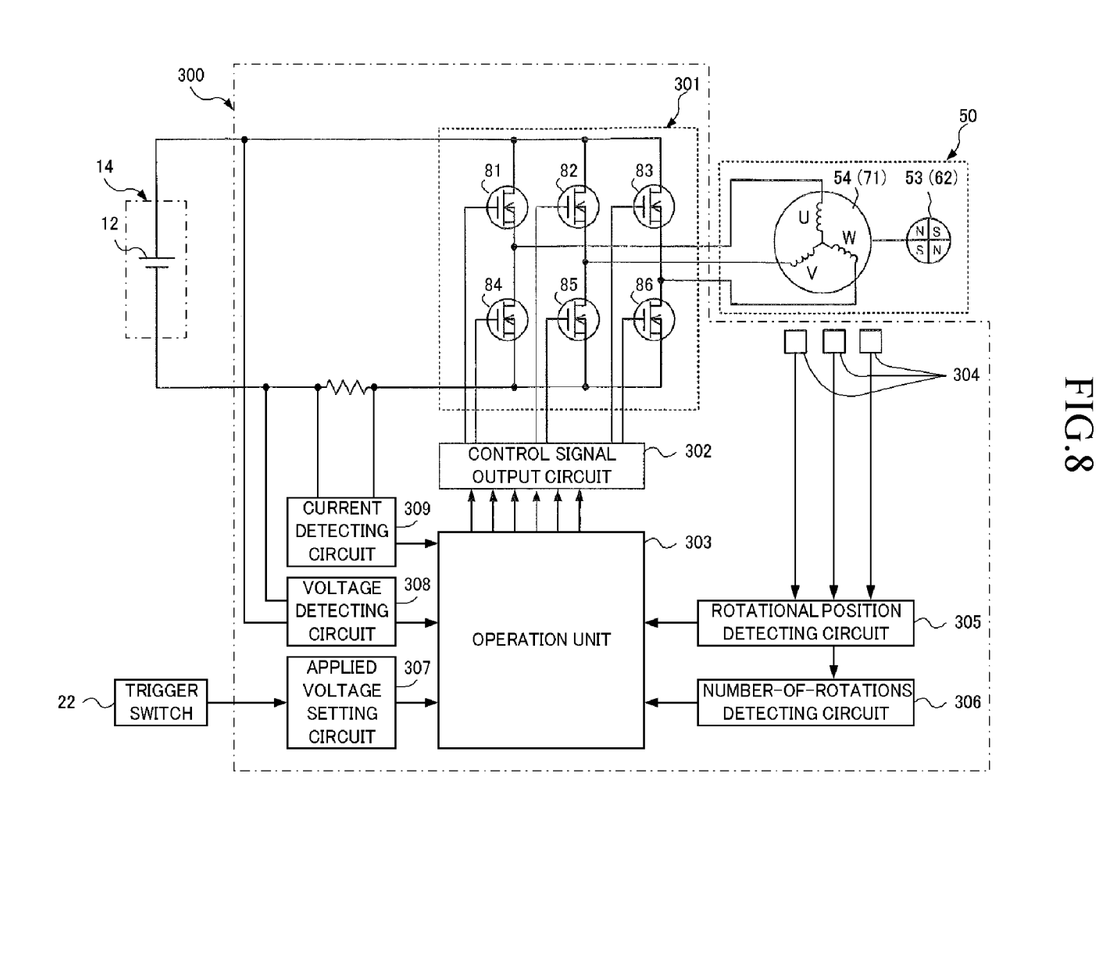
FIG. 8 is a functional block diagram of the electric grasscutter shown in FIG. 1.

Referring to FIG. 8, the circuit configurations of the power supply unit 10, the motor 50 and the motor drive circuit 300 will be described below.

The power supply unit 10 includes the battery 12 and the power supply circuit 14, as described above. The battery 12 outputs DC voltage. The power supply circuit 14 applies the output voltage of the battery 12 to the inverter 301 of the motor drive circuit 300.

The motor 50 includes the rotor 53 and the stator 54, as described above. The rotor 53 includes the magnet 62. The stator 54 includes the stator winding 71. The stator winding 71 includes star-coupled three-phase coils U, V, W. The coils U, V, W include the aforementioned coils 711. For easier understanding, the rotor 53 (magnet 62) and the stator 54 (stator winding 71) are illustrated schematically in FIG. 8.

The motor drive circuit 300 includes the inverter 301, a control signal output circuit 302, an operation unit 303, rotational position detecting elements 304, a rotational position detecting circuit 305, a number-of-rotations detecting circuit 306, an applied voltage setting circuit 307, a voltage detecting circuit 308, and a current detecting circuit 309.

The inverter 301 includes six FETs 81 to 86 connected in a three-phase bridge configuration, and six unillustrated flywheel diodes connected to between the collectors and the emitters of the respective FETs 81 to 86. The three FETs 81 to 83 have their collectors connected to the positive output terminal of the power supply circuit 14, and their emitters respectively connected to the coils U, V, W of the stator winding 71. The three FETs 84 to 86 have their collectors respectively connected to the coils U, V, W of the stator winding 71, and their emitters connected to the negative output terminal of the power supply circuit 14. The gates of the six FETs 81 to 86 are connected to the control signal output circuit 302.

Based on a switching element drive signal input from the operation unit 303, the control signal output circuit 302 outputs a control signal (PWM signal) to the gates of the FETs 81 to 86 to perform the switching operations of the FETs 81 to 86 in a predetermined sequence. Accordingly, the DC voltage applied to the inverter 301 from the power supply circuit 14 is converted to three-phase (U phase, V phase, W phase) drive voltages to drive the motor 50.

The operation unit 303 is a microcomputer including a ROM to store a processing program and control data, a CPU which executes the processing program to generate the switching element drive signal, a RAM to temporarily store data, and an internal timer to counting the time. The operation unit 303 outputs the switching element drive signal to the control signal output circuit 302 to control the switching operations of the FETs 81 to 86, thereby controlling the applied voltage and the output (number of rotations) of the motor 50.

The three rotational position detecting elements 304 are disposed close to the rotor 53 with phase differences of 120 degrees (electric angles) thereamong. The rotational position detecting element 304, which consists of a Hall element or the like, detects the magnetic pole of the magnet 62, and outputs a detection signal to the rotational position detecting circuit 305.

The rotational position detecting circuit 305 detects the rotational position of the rotor 53 based on the detection signals input from the three rotational position detecting elements 304, and outputs a rotational position detection signal indicative of the detected rotational position to the operation unit 303 and the number-of-rotations detecting circuit 306.

The number-of-rotations detecting circuit 306 detects the number of rotations of the rotor 53 based on the rotational position detection signal input from the rotational position detecting circuit 305, and outputs a number-of-rotations detection signal indicative of the detected number of rotations to the operation unit 303.

Based on the rotational position detection signal input from the rotational position detecting circuit 305 and the number-of-rotations detection signal input from the number-of-rotations detecting circuit 306, the operation unit 303 outputs the switching element drive signal to the control signal output circuit 302 in such a way that the FETs 81 to 86 perform switching operations in the proper sequence and at the proper timings.

The above operation controls the motor 50 to rotate with a stable output (number of rotations).

The trigger switch 22 outputs a trigger signal indicative of the trigger amount to the applied voltage setting circuit 307.

Based on the trigger signal input from the trigger switch 22, the applied voltage setting circuit 307 sets a target value for the applied voltage to the stator winding 71 by referring to a prestored table. Then, the applied voltage setting circuit 307 outputs an applied voltage setting signal indicative of the set target value for the applied voltage.

Based on the applied voltage setting signal input from the applied voltage setting circuit 307, the operation unit 303 outputs the switching element drive signal to the control signal output circuit 302 in such a way that the output voltages of the FETs 81 to 86 (applied voltage to the stator winding 71) matches with the set target value.

The control signal output circuit 302 modulates the pulse widths of control signals to be output to the FETs 81 to 86 according to the switching element drive signal input from the operation unit 303.

Accordingly, the motor drive circuit 300 can adjust the output (number of rotations) of the motor 50 according to the trigger amount of the trigger switch 22 without having means for adjusting the applied voltage to the inverter 301.

The voltage detecting circuit 308 detects the output voltage of the power supply circuit 14 (applied voltage to the inverter 301), and outputs a voltage detection signal indicative of the detected voltage to the operation unit 303.

Based on the voltage detection signal input from the voltage detecting circuit 308, the operation unit 303 outputs the switching element drive signal to the control signal output circuit 302 in such a way that the output voltages of the FETs 81 to 86 (applied voltage to the stator winding 71) matches with the set target value.

The control signal output circuit 302 modulates the pulse widths of control signals to be output to the FETs 81 to 86 according to the switching element drive signal input from the operation unit 303.

Accordingly, the motor drive circuit 300 can stabilize the output (number of rotations) of the motor 50 for a change in the output voltage of the battery 12 without having means for adjusting the output voltage of the power supply circuit 14. Further, even when a battery of a different battery voltage is mounted instead of the battery 12, for example, the output (number of rotations) of the motor 50 can be stabilized.

The current detecting circuit 309 detects the current flowing across the inverter 301 and the stator winding 71, and outputs a current detection signal indicative of the detected current to the operation unit 303.

Based on the current detection signal input from the current detecting circuit 309, the operation unit 303 compares the current flowing across the inverter 301 and the stator winding 71 with a predetermined reference value. When it is discriminated that the current flowing across the inverter 301 and the stator winding 71 exceeds the predetermined reference value, the operation unit 303 outputs the switching element drive signal to the control signal output circuit 302 in such a way that all of the FETs 81 to 86 will be turned OFF.

Then, the control signal output circuit 302 disables the control signals to be output to the FETs 81 to 86 according to the switching element drive signal input from the operation unit 303.

Accordingly, the motor drive circuit 300 can block the current flowing across the inverter 301 and the stator winding 71 according to a change in the current flowing across the inverter 301 and the stator winding 71 without having means for blocking the output voltage of the power supply circuit 14 (applied voltage to the inverter 301). Therefore, it is possible to prevent burning of the motor drive board 55 and the stator winding 71 caused by, for example, the excess current at the time of overload.

The operation unit 303 and the control signal output circuit 302 constitute the control section according to the invention.

As described above, the electric grasscutter 1 is configured to have the motor 50, which is a brushless DC motor, as the drive source. The motor drive board 55 which drives the motor 50 includes the inverter 301 having the FETs 81 to 86 as the switching elements. The FETs 81 to 86 are mounted on the motor drive board 55 accommodated in the motor housing 51, and are fixed in contact with the motor housing 51. As the motor housing 51 serves as a heat sink for the FETs 81 to 86, therefore, burning of the motor drive board 55 and reduction in the output of the motor 50, originated from overheating of the FETs 81 to 86, are prevented.

In addition, since the motor housing 51 is formed of an aluminum alloy having a comparatively high thermal conductivity, it has a high effect of cooling the FETs 81 to 86.

The FETs 81 to 86 are fixed in contact with the floor surface of the motor housing 51 which is formed close to the portion facing the rotary blade 42. Therefore, the flow of air produced by the rotary blade 42 cools the floor surface of the motor housing 51 to improve the effect of cooling the FETs 81 to 86. In addition, water drops, moisture, or the like adhered to plants to be cut by the rotary blade 42 cools the floor surface of the motor housing 51, thereby improving the effect of cooling the FETs 81 to 86.

Since the rotor 53 is provided with the fan 68, the motor drive board 55 and the stator winding 71 of the stator 54 which are accommodated in the motor housing 51 are cooled to prevent burning of the motor drive board 55 and reduction in the output of the motor 50.

Further, the exhaust port 56 is formed in the motor housing 51, and the inlet port 38 is formed in the coupling section 30. Therefore, the air suction and exhaust of the motor housing 51 improve the effect of cooling the motor drive board 55 and the stator winding 71 of the stator 54 which are accommodated in the motor housing 51. In addition, the inlet port 38 is located apart from the rotary blade 42 to prevent a foreign matter from entering the motor housing 51.

The rotor 53 and the stator 54 are formed in disc shapes. This miniaturizes the motor 50, and because the stator 54 has a large surface area, the effect of cooling the stator winding 71 of the stator 54 is improved.

The flange 61 of a magnetic substance is provided at the rotor 53, so that the inertia of the rotor 53 is increased, thus suppressing irregular rotation of the rotor 53, and vibration and noise thereof. Further, since the flange 61 is provided with the balance part, vibration and noise originated from imbalance of the rotor 53 are suppressed.

The invention is not limited to the foregoing embodiment, and various modifications within the scope of the claims are also encompassed in the scope of the invention.

For example, although the FETs 81 to 86 are fixed in contact with the motor housing 51 of an aluminum alloy, the FET according to the invention is not limited thereto, and may be fixed in contact with a metal heat sink of an aluminum alloy, a copper alloy or the like provided at a motor housing of a synthetic resin, such as fiber reinforced plastics.

Although the fan 68 having a plurality of blades 681 is provided at the rotor 53, the fan according to the invention is not limited to such a fan, and it may include, for example, a plurality of blades formed at the flange in such a way as to protrude from the rotor.

The invention is not limited to the electric grasscutter exemplified in the foregoing embodiment, and can be applied to a wide variety of work machines which use a brushless motor as the drive source, and is suitable particularly for work machines, such as a grinder, a polisher, a router and a precipitator, in which the power of the brushless motor is directly transmitted to work tools (rotary blade, fan, etc.) without intervening a reduction gear.

In addition, the materials for the individual components, and the shapes, the quantities, the layouts, the functions, etc. thereof can be properly modified within the scope of achieving the object of the invention.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

This application claims priority based on Japanese Patent Application No. 2009-229095 filed on Sep. 30, 2009, the entire disclosure of which is incorporated herein by reference in its entirety.

REFERENCE SIGNS LIST 1 electric grasscutter
10 power supply unit
11 power supply housing
12 battery
14 power supply circuit
15 main switch
20 operation section
21 handle
22 trigger switch
30 coupling section
36 auxiliary handle
37 protection cover
38 inlet port
40 drive unit
42 rotary blade (work tool)
50 motor
52 output shaft
53 rotor
54 stator
55 motor drive board
56 exhaust port
57, 58 bearing
59 yoke
61 flange
62 magnet
68 fan
71 stator winding
72 yoke
81-86 FET
300 motor drive circuit
301 inverter
302 control signal output circuit
303 operation unit
304 rotational position detecting elements
305 rotational position detecting circuit
306 number-of-rotations detecting circuit
307 applied voltage setting circuit
308 voltage detecting circuit
309 current detecting circuit
611 fixing member
612 support member
613 rib
614 hole
615 hole
681 blade
711 coil

The invention claimed is:

1. A work machine comprising:
   a housing provided at one longitudinal end of the work machine;
   an output shaft rotatably supported at the housing;
   a brushless motor accommodated in the housing and including a rotor provided integrally with the output shaft, a stator fixed to the housing, and a fan rotatable with the rotor; a drive circuit including an FET as a switching element and a control section to control the FET, and driving the brushless motor; a work tool that can be attached to the output shaft and is provided at the one longitudinal end of the work machine;
   an operation section that is disposed apart from the housing and comprises a handle;
   and a coupling section that couples the housing to the operation section, wherein the coupling section is hollow, wherein the fan is rotated to suction air into an inlet port disposed apart from the work tool and the housing, and to exhaust the suctioned air through the inside of the coupling section and out of an exhaust port formed in the housing.

2. The work machine according to claim 1, wherein the housing is formed of an aluminum alloy.

3. The work machine according to claim 1, wherein the FET is disposed close to that portion of the housing which faces the work tool.

4. The work machine according to claim 1, wherein the inlet port communicating with an interior of the housing is formed, apart from the work tool, in the coupling section.

5. The work machine according to claim 1, wherein the rotor includes an annular magnet having a plurality of magnetic poles arranged in a circumferential direction and is formed into a disc shape, and
   the stator faces to one main surface of the magnet, includes a plurality of coils arranged in the circumferential direction, and is formed into a disc shape.

6. The work machine according to claim 5, wherein the rotor further includes a magnetic flange fixed to the output shaft and covering the other main surface of the magnet, and the magnet is fixed to the flange.

7. The work machine according to claim 6, wherein a blade is formed at the flange in such a way as to protrude from the rotor.

8. The work machine according to claim 6, herein the flange is provided with a balance part for correcting imbalance of the rotor.

9. The work machine according to claim 6, wherein a hole or a groove is formed in the flange between an outer periphery of the output shaft and an inner periphery of the magnet for weight reduction.

10. The work machine according to claim 1, further comprising:
    a power supply unit that supplies power to the drive circuit; and
    a voltage detecting circuit that detects an output voltage of the power supply unit,
    wherein the control section controls the FET based on the output voltage of the power supply unit detected by the voltage detecting circuit in such a way that a voltage applied to the brushless motor becomes a predetermined value.

11. The work machine according to claim 1, further comprising:
   a current detecting circuit that detects a current flowing in the brushless motor,
   wherein the control section compares the current flowing in the brushless motor detected by the current detecting circuit with a predetermined reference value to control the FET in such a way as to stop driving the brushless motor, when the current flowing in the brushless motor exceeds the predetermined reference value.

12. The work machine according to claim 1, wherein the operation section includes a trigger switch, and
   the control section controls the FET in such a way that a voltage applied to the brushless motor becomes a predetermined value corresponding to a trigger amount of the trigger switch.

13. The work machine according to claim 1, wherein the drive circuit is accommodated in the housing.

14. The work machine according to claim 1, wherein the FET is heat-exchangeable with the housing or a heat sink provided in the housing.

15. The work machine according to claim 1, wherein the driving circuit or a heat sink that is heat-exchangeable with the driving circuit is located proximate to an air path from the inlet port to the exhaust port.

\* \* \* \* \*